United States Patent [19]

Lamar et al.

[11] 3,932,194

[45] Jan. 13, 1976

[54] MILLED TALC MATERIAL AND MILLING METHOD

[75] Inventors: Richard Seyb Lamar, Littleton; Norman Bach Scheffel, Parker, both of Colo.

[73] Assignee: Johns-Manville Corporation, Denver, Colo.

[22] Filed: Feb. 11, 1974

[21] Appl. No.: 441,192

[52] U.S. Cl. .................. 106/306; 106/309; 241/5
[51] Int. Cl.² ....................................... C09C 1/02
[58] Field of Search ............ 106/306, 288 B, 309; 241/5

[56] References Cited
UNITED STATES PATENTS

| | | | |
|---|---|---|---|
| 3,366,501 | 1/1968 | Lamar | 106/306 |
| 3,643,875 | 2/1972 | Dille | 241/5 |

Primary Examiner—Patrick P. Garvin
Assistant Examiner—J. V. Howard
Attorney, Agent, or Firm—Robert M. Krone; James W. McClain

[57] ABSTRACT

Milled talc materials containing about twenty to about thirty-five weight percent tremolite and having particle size distributions such that no more than five percent of the particles are larger than 10 microns, no more than 12 percent of the particles are larger than five microns and no more than 15 percent of the particles are smaller than 0.3 microns in equivalent spherical diameter have improved opacifying properties for use in paper, rubber, plastics and paint manufacture. The materials can be obtained by jet or fluid energy milling and by controlling the milling variables to produce particle size distributions within the critical range.

15 Claims, 5 Drawing Figures

MILLED TALC MATERIAL AND MILLING METHOD

IMPROVED MILLED TALC MATERIAL AND MILLING METHOD

This invention relates to finely milled talc material containing about 20 to about 35 weight percent tremolite milled in such a manner that the resulting particle size distribution produces excellent opacification properties. The invention also relates to a method of milling talc materials to achieve a particle size distribution within a critical range.

BACKGROUND OF THE INVENTION

High brightness fillers are used extensively in the manufacture of various products such as specialty papers where special properties cannot be achieved with the usual clay fillers. Some of these special properties include high brightness, high opacity at low basis weight, high fidelity printing, etc. The numerous, and now relatively frequent increases in postal rates have stimulated increased use of high brightness fillers having high opacity and low print show-through at low basis weight in paper for use in printing commonly mailed items such as magazines.

Prior to the present invention, high brightness fillers were produced in a variety of pigment types from a number of different natural minerals as well as synthetic materials. Also, a few highly refined and specially processed clays are sometimes used as a high brightness filler, e.g., calcined kaolin.

One high brightness filler is made by fusing sand and soda ash to form sodium silicate. Afterward the sodium silicate is dissolved in water and calcium hydroxide is added to form amorphous calcium silicate which precipitates in the form of finely divided particles. Although this material is a satisfactory high brightness filler, it is expensive to produce, particularly because of the energy required to fuse the starting materials and to dry the final product.

Titanium dioxide, in either anathase or rutile crystal form, is an excellent opacifier, however, its high cost and relatively short supply limit its use in many areas.

It is known to produce a high brightness filler by grinding talc containing tremolite in mechanical mills such as a Raymond ring-roller mill followed by a Raymond vertical mill and to remove the larger particles of the resultant product with a cyclone or centrifugal classifier. Although such products have many uses their brightness and their ability to opacify are not as high as desired for many applications.

It is also known to mill talc mineral to very fine particle sizes using either high pressure steam in what are commonly known as jet mills or in vibratory mills using spherical grinding media. These processes are disclosed in U.S. Pat. Nos. 3,366,501, 3,643,875 and 3,476,576. The process disclosed in U.S. Pat. No. 3,366,501 is undesirable because it requires a calcining step which is costly, particularly in view of the present fuel shortage. Similar particle size distributions to those produced by the two processes disclosed in U.S. Pat. Nos. 3,476,576 and 3,643,875 do not opacify as well as might have been expected from a mathematical analysis of their particle size distributions using the Mie theory. One reason may be that this theory assumes the particles are all spherical and of equal size, which of course is not true.

BRIEF SUMMARY OF THE INVENTION

It has been discovered that the opacifying capability of a talc mineral depends not only upon its degree of fineness but more importantly upon the presence of a critical amount of tremolite mineral and on the particle size distribution, particularly on the amount of relatively large particles present, such as +5 micron particles, and on the amount of extremely small particles present, such as less than 0.3 micron particles. It has been discovered that when talc minerals containing substantial amounts of tremolite are ground, such as by fluid energy or jet milling, to produce a particle size distribution containing only small amounts of +5 micron and −0.3 micron particles the opacifying properties of the material are unexpectedly and significantly improved. Since fillers for use in paper, rubber, etc., are used in very large tonnages small increases in opacifying properties are extremely significant when the tonnage and dollar savings such small improvements produce are considered.

DETAILED DESCRIPTION AND PREFERRED EMBODIMENTS

Finely ground talc ore, preferably about −200 to about −325 mesh, obtained by any conventional grinding technique, such as on a Raymond ring-roller mill, is further milled to a desired particle size distribution using either a fluid energy mill, such as a JET-O-MIZER Double 88 mill manufactured by Fluid Energy Processing and Equipment Company or a jet mill such as a MAJAC 30-15 JET PULVERIZER manufactured by Majac, Inc. The feed for these mills can be prepared by ball milling, roller milling, hammer milling, dry pan milling or by any other conventional technique of grinding. The particle size of the feed to the jet or fluid energy mills does not appear to significantly affect either the final particle size distribution or the allowable feed rate. There is a practical limitation though on the maximum size of particles that can be fed into these mills and also as the size of the particles in the feed increase abrasion in the mills increases. A practical system is to feed minus 1 inch talc material to a Raymond ring-roller mill and feed the resultant material to the jet or fluid energy mill.

Figure 1:
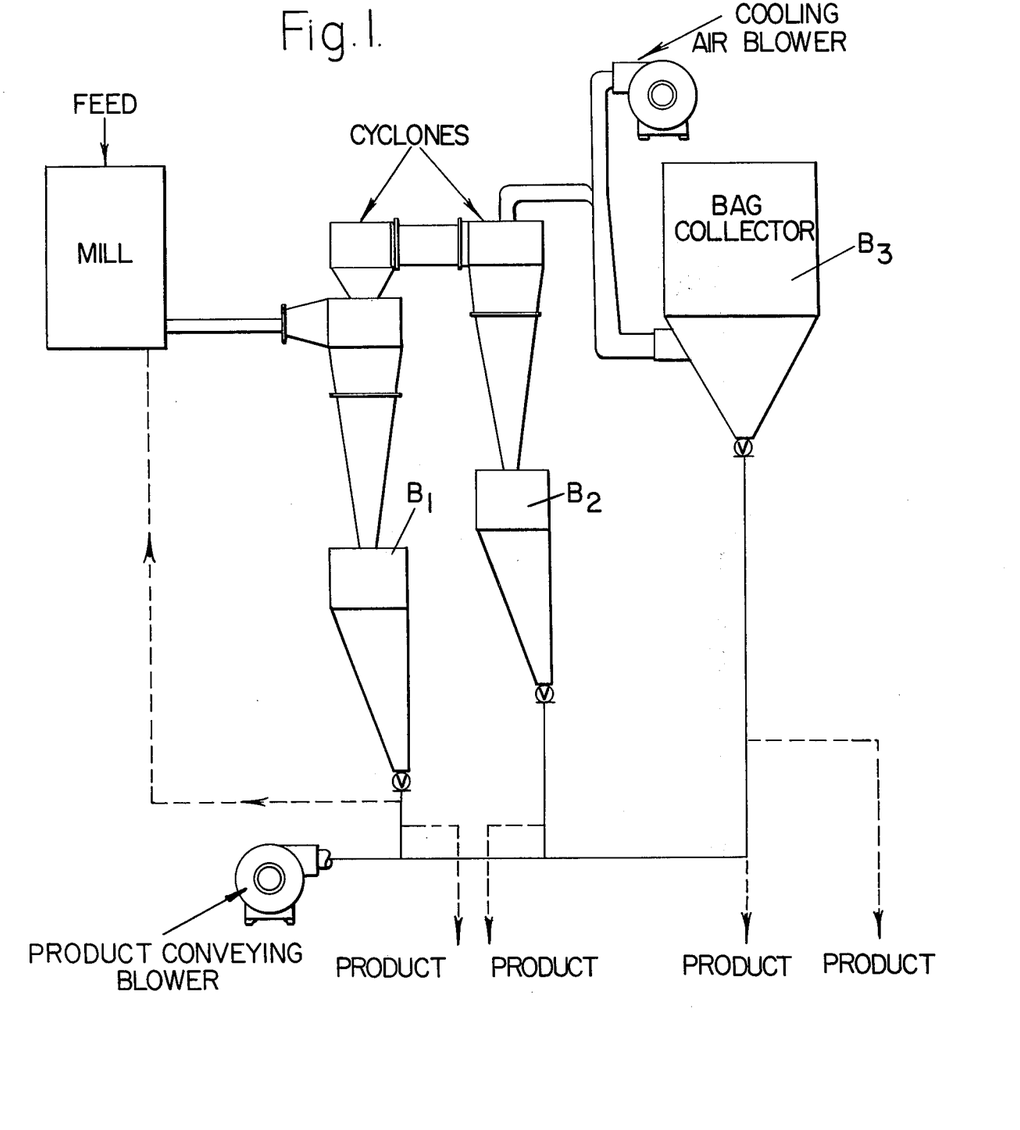
FIG. 1 shows schematically milling systems that can be used to make the product of the present invention.

Typical systems used in the present invention are illustrated schematically in FIG. 1. A finely ground talc material, such as −325 mesh, is fed into either a jet mill or a fluid energy mill at a controlled rate. The milled product is removed from the mill entrained in a hot gas, such as hot air and/or steam, and passed consecutively through one or more conventional cyclone separators $B_1$ and $B_2$ and a conventional bag collector $B_3$. The product removed from each of the cyclones and the bag collector can be either removed separately and used or can be blended together to produce a desired particle size distribution. Usually, the product of the first cyclone will be more coarse than the product of the second cyclone and the product of the second cyclone will be more coarse than the product of the bag collector. Although the product of the first cyclone could be recycled back to the mill to obtain a finer final product, it is presently preferred to blend the products coming from both cyclones with the bag collector product in an air stream provided by a product conveying blower.

Since superheated steam or hot air are used in the grinding process, it is desirable to cool the air or steam stream prior to its entering the bag collector to protect the latter from heat damage. This can be accomplished by heat transfer devices located in or around the piping within which the stream is contained or, as shown in FIG. 1, by introducing cool air into the stream with a cooling air blower.

All of the equipment shown in FIG. 1 is conventional and therefore could be replaced by other equipment known to produce equivalent functions.

The starting material can be any naturally occurring or synthetic talc bearing material that contains from about 20 to about 35 percent of the mineral tremolite $[Ca_2Mg_5 (OH)_2 (Si_4O_{11})_2]$. If the material contains much more than 35 percent tremolite, the milled product is too abrasive for many applications, particularly as a paper filler.

If the starting material contains much less than 20 percent tremolite the resultant particle size distribution is affected and the ability of the milled material to opacify is significantly reduced. For example, the talc material designated Sample A in Table II contained only about 5 percent tremolite whereas the talc material of Sample B contained about 30 percent tremolite.

Figure 2:
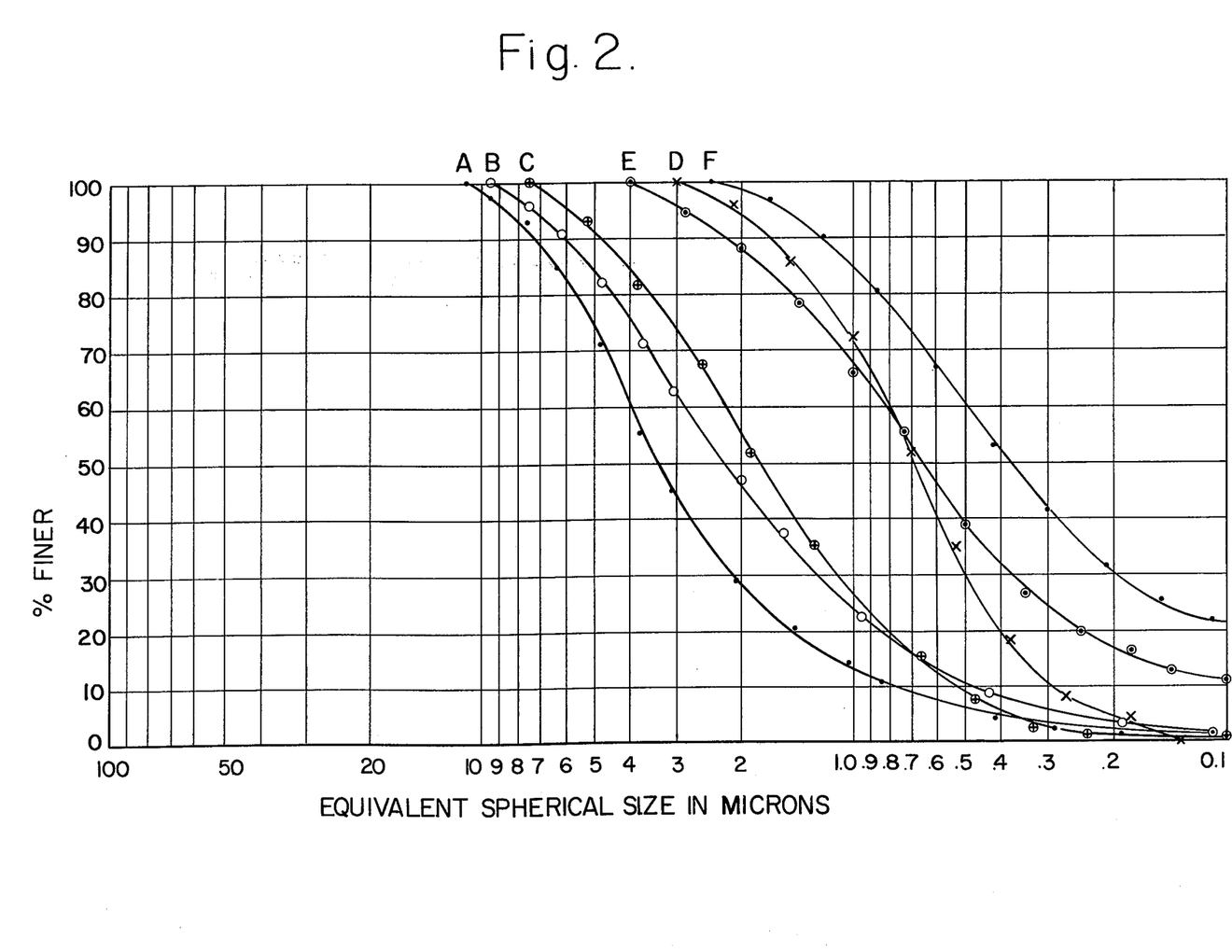
FIG. 2 shows the particle size distributions of Samples A–F.

Although Samples A and B were ground in the same equipment, a Raymond ring-roller mill followed by a Raymond vertical mill, under the same conditions the particle size distributions of the two ground materials were significantly different as shown by the data in Table II and curves A and B in FIG. 2. Using material of Sample A containing only about 5 percent tremolite to coat paper 9.8 pounds per ream were required to achieve 85 percent opacity. In contrast, using material from Sample B, containing about 30 percent tremolite, to coat the same type of paper in the same manner required only 7.2 pounds per ream to achieve 85 percent opacity.

The reason why the ground talc material having the higher tremolite content has better opacifying properties than the low tremolite ground talc material is not completely understood. The presence of about 30 percent tremolite in Sample B produced a different particle size distribution and this alone might account for most of the different properties. Also tremolite has a slightly higher index of refraction than talc which could account for part of the difference.

A preferred talc material for use in the present invention typically results in an analysis such as that reported in Table I.

TABLE I

| | |
|---|---|
| $SiO_2$ | 61.2 |
| $TiO_2$ | 0.01 |
| $Al_2O_3$ | 0.9 |
| $Fe_2O_3$ | 0.3 |
| CaO | 4.9 |
| MgO | 25.5 |
| $Na_2O$ | 2.0 |
| $K_2O$ | 1.4 |
| Chemically Combined Water | 2.7 |
| Free Moisture | 0.3 |
| Minor Impurities | Remainder |

The above analysis is merely typical and the percentages of ingredients and mineral forms will vary some as might be expected in a naturally occurring deposit.

TABLE II

| TYPE OF FINAL MILLING USED | | A | B | C | D | E | F | G | H | I | J | K | L | M | N |
|---|---|---|---|---|---|---|---|---|---|---|---|---|---|---|---|
| VIBRATORY | | | | | | X | X | | | | | | | | |
| FLUID ENERGY JET | | | | X | X | | | X | X | X | | | | X | |
| | | | | | | | | | | | X | X | X | | X |
| RAYMOND VERTICAL | | X | X | | | | | | | | | | | | |
| PARTICLE SIZE (μ) | | A | B | C | D | E | F | G | H | I | J | K | L | M | N |
| 11.0 | PER- | 100 | 100 | 100 | 100 | 100 | 100 | 100 | 100 | 100 | 100 | 98.3 | 100 | 100 | 95.4 |
| 8.0 | CENT | 94.3 | 97.5 | 100 | 100 | 100 | 100 | 100 | 100 | 100 | 100 | 95.8 | 100 | 98.0 | 89.2 |
| 5.0 | FIN- | 72.2 | 83.6 | 92.0 | 100 | 100 | 100 | 96.2 | 98.2 | 100 | 98.4 | 89.0 | 100 | 84.8 | 73.9 |
| 4.0 | ER | 60.4 | 75.2 | 83.7 | 100 | 100 | 100 | 91.4 | 94.5 | 98.3 | 97.3 | 84.2 | 98.3 | 75.7 | 63.0 |
| 3.0 | | 43.0 | 62.5 | 72.3 | 100 | 95.8 | 100 | 83.1 | 86.4 | 94.8 | 94.8 | 76.2 | 94.8 | 62.6 | 48.3 |
| 2.0 | | 28.0 | 47.0 | 55.1 | 93.5 | 88.0 | 98.6 | 67.5 | 69.0 | 87.6 | 89.2 | 62.4 | 88.3 | 45.9 | 31.8 |
| 1.0 | | 13.6 | 24.3 | 26.2 | 71.2 | 66.3 | 85.8 | 39.8 | 36.8 | 63.4 | 70.7 | 33.8 | 63.4 | 23.3 | 11.9 |
| 0.6 | | 7.0 | 13.5 | 12.0 | 42.8 | 46.2 | 66.8 | 21.0 | 16.3 | 36.5 | 43.5 | 10.4 | 38.2 | 9.4 | 4.1 |
| 0.5 | | 5.8 | 10.4 | 7.8 | 32.2 | 38.8 | 59.7 | 14.5 | 9.7 | 27.0 | 31.8 | 5.7 | 29.6 | 6.4 | 2.5 |
| 0.4 | | 4.1 | 7.8 | 4.4 | 21.8 | 31.8 | 51.5 | 8.6 | 5.7 | 17.5 | 17.6 | 2.5 | 19.3 | 3.8 | 1.8 |
| 0.3 | | 2.9 | 5.3 | 1.7 | 11.7 | 23.6 | 42.0 | 4.3 | 2.8 | 9.7 | 6.3 | 1.8 | 8.8 | 2.8 | 1.5 |
| 0.2 | | 1.9 | 3.4 | 1.3 | 4.8 | 19.5 | 30.5 | 2.1 | 1.4 | 3.8 | 1.8 | 0.5 | 3.6 | 1.6 | 1.3 |
| 0.1 | | <1.0 | <1.5 | <1.0 | <1.0 | 10.8 | 21.8 | <1.0 | <1.0 | <1.0 | <1.0 | <1.0 | <1.0 | <1.0 | <1.0 |
| S | | .183 | .240 | .254 | .349 | .197 | .178 | .276 | .298 | .318 | .329 | .287 | .324 | .238 | .207 |
| VALVE dm (μ) | | .83 | .91 | .54 | .40 | .26 | .18 | .50 | .48 | .50 | .40 | .62 | .50 | .63 | .85 |
| LBS/REAM 85% OPACITY | | 9.8 | 7.2 | 6.9 | 4.7 | 7.8 | 8.1 | 6.7 | 5.9 | 5.4 | 5.2 | 6.2 | 5.5 | 7.8 | 8.4 |

An X-ray diffraction pattern of the talc material reveals that talc is the major mineral phase present along with about 30 percent tremolite and minor amounts of calcite, quartz and illite.

Using a fluid energy mill, hot air or steam is fed into the mill at a controlled rate, at a controlled temperature, and at a controlled pressure. The material to be milled is also fed into the mill at a controlled rate. The resultant particle size distribution can be controlled, within certain limitations depending upon the system, by varying one or more of these variables. Generally, although there are exceptions, the fineness of the milled product increases as the temperature and pressure of the air or steam are increased and as the feed rate of the material to be milled is decreased.

Generally, to obtain the same or similar particle size distribution the pressure and/or temperature of the air or steam feed must be increased as the feed rate of the material to be milled is increased. The cost of supplying and using air or steam at temperatures and pressures above certain levels becomes very high because heavier gauge equipment and more refractory and costly materials are required to generate and contain extremely hot air and steam at very high pressures. Thus, the limitation on the feed rate of the material to be milled is usually limited by a practical set of temperature and pressure conditions on the air or steam feed and on the particle size distribution desired in the final milled product.

To achieve the particle size distributions of the present invention using a fluid energy mill typical milling parameters are steam at a temperature of about 700°–750° F. introduced at pressures of about 200–250 psig and at the rate of about 5 tons per hour at a talc material feed rate of about 1 ton per hour. When using a jet mill typical parameters are a steam temperature of about 600°–650° F. introduced at pressures of about 150–175 psig at a steam:material feed ratio of about 5:1.

To demonstrate the criticality of the particle size distribution range of the present invention a talc material containing about 30 percent tremolite was first milled in a Raymond ring-roller mill and then further milled in different types of mills and at various feed rates to produce different particle size distributions. The results of these milling tests are reported in Table II and many of the results are illustrated in FIGS. 2–5.

The vibratory mill used to mill Samples E and F was a batch type conventional vibratory mill using spherical grinding media. This type of mill was selected because of its known ability to produce a large percentage of sub-micron particles.

The fluid energy and jet mills used for Samples C, D, G, H, I, J, K and L respectively are identified earlier in this specification.

The particle size distribution for each of the samples was determined by the well known Andreasen pipette technique. The mean particle size, $d_m$(micron), was determined with the aid of the well known Fisher SUB-SIEVE SIZER manufactured by the Fisher Scientific Co.

To determine the opacifying property of the various milled samples laboratory hand sheets were made and evaluated. In each case 1.2 grams of a standard sulfate pulp, 0.012 grams of a standard fortified size, 0.1 milliliter of a standard alum solution, 400 milliliters of water and the indicated amount of milled talc material were beat for five minutes in a blender and then formed in a laboratory hand sheet machine. In each case the testing conditions and formulations remained the same except for the indicated amount and type of milled talc material sample contained therein. No provision was made for white water recirculation and therefore the pigment losses in all samples were considerably higher than would be expected in full size paper making equipment.

The scattering coefficient (S value) was determined by the well known Kubelka-Munk analysis as reported in the Pigments Progress Report, Report No. 9 (140-9 PIR FILE) published by DuPont.

The scattering coefficient is a mathematical relationship between opacity, reflectivity, and basis weight with the S value relating to the ability to reflect or scatter light per unit of thickness. The S value, therefore, is an excellent indication as to the individual contribution of a given pigment to the article it is contained in.

Samples E and F, vibration milled for 8 and 24 hours respectively, displayed relative small mean particle sizes and the particle size distributions were much different in the sub-micron area, particularly in the area below 0.3 micron, than the samples obtained by fluid energy or jet milling. Curves E and F in FIG. 2 illustrate this difference.

Figure 3:
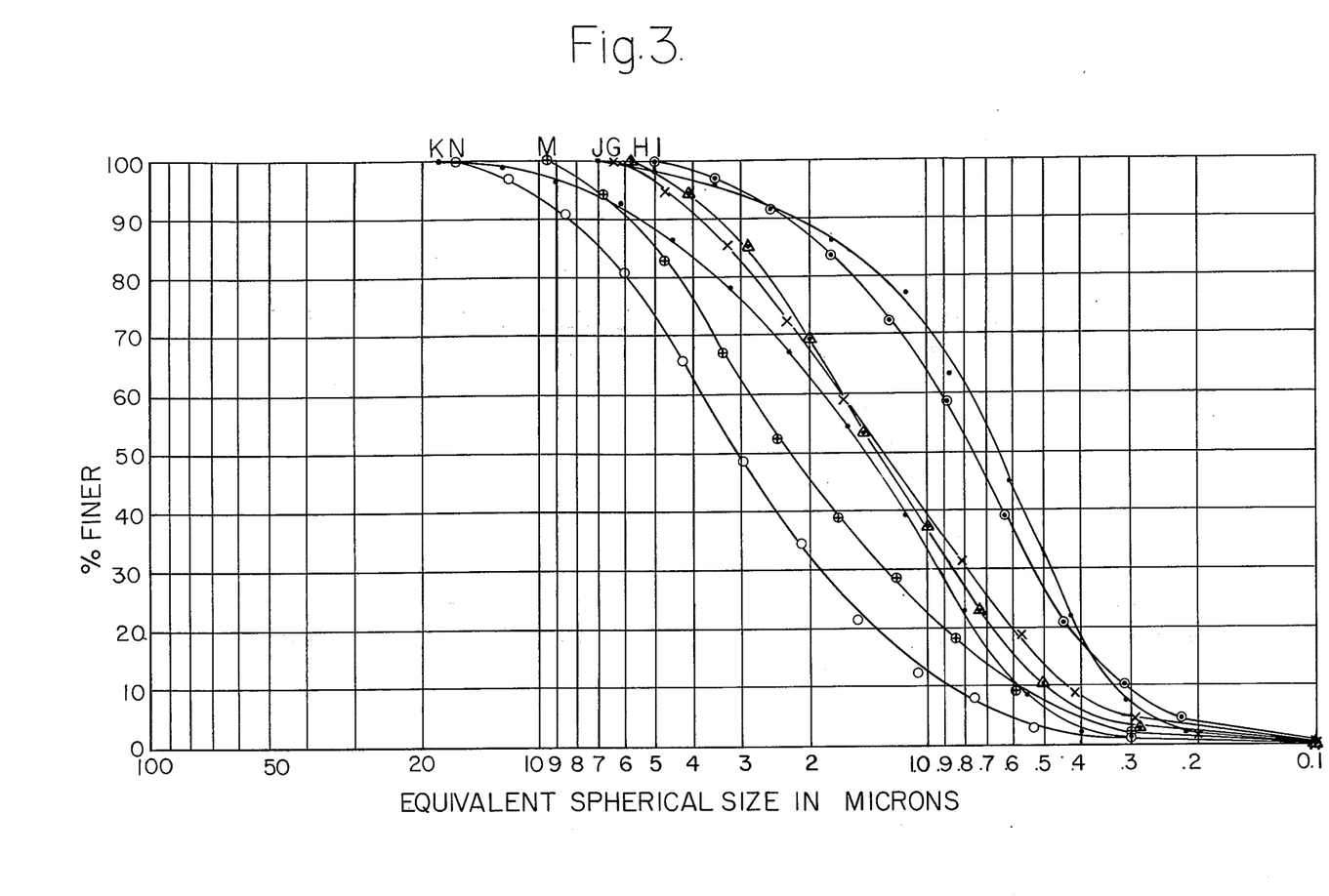
FIG. 3 shows the particle size distributions of Samples G–K, M and N. A curve for Sample L is not illustrated in FIG. 3 because of its similarity to one or more of the curves that are illustrated.

Samples K, M and N and curves K, M and N in FIG. 3 illustrate the criticality of the amount of particles larger than 5 microns in the sample on its opacifying properties. Sample K, although containing some larger particles than Samples M and N, had a significantly smaller percentage of +5 micron particles than Samples M and N which resulted in Sample K having significantly better opacifying properties than Samples M and N.

Figure 4:
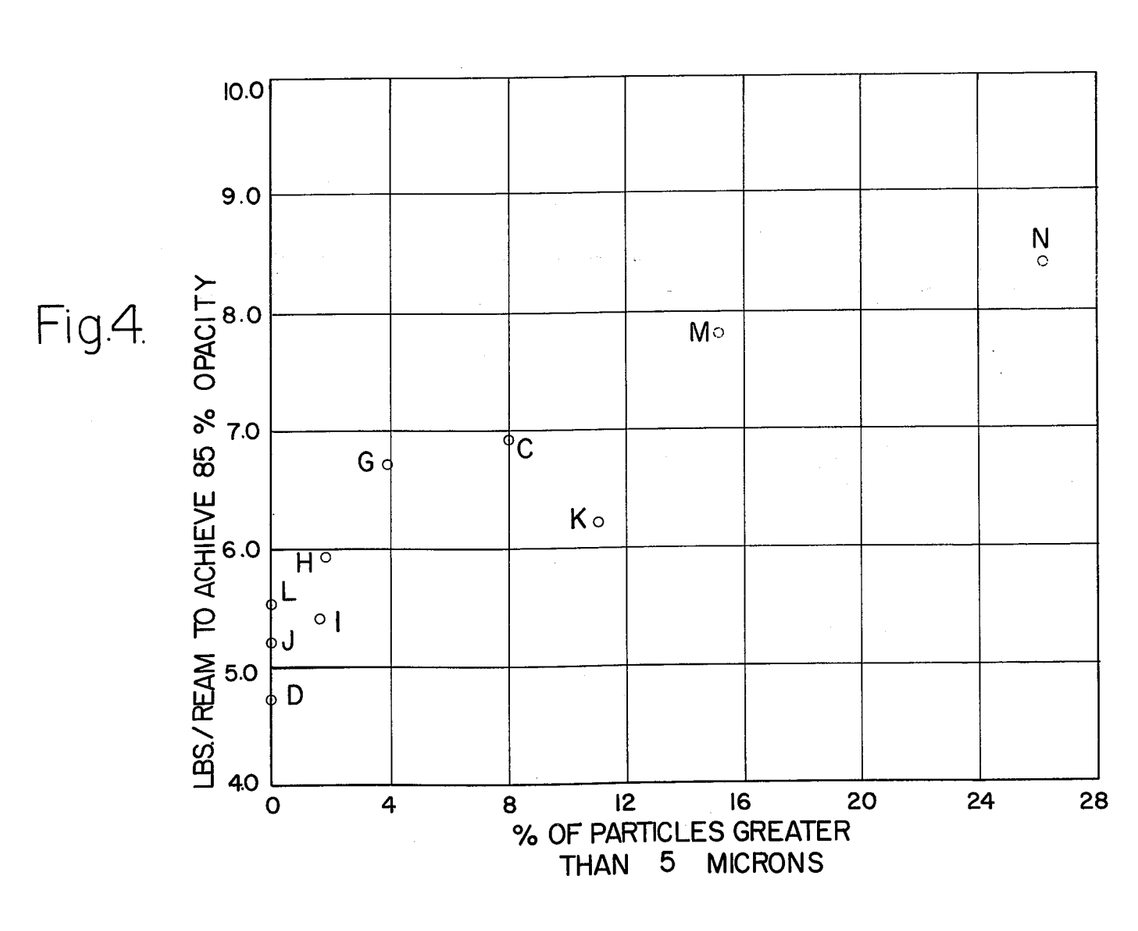
FIG. 4 is a graph in which the percentage of particles larger than 5 microns in each of the jet or fluid energy milled samples is plotted versus the opacifying property of the sample.

FIG. 4 shows the opacifying property of the fluid energy and jet milled samples versus the percentage of +5 micron particles in the sample. Although the samples do not fall on a straight line or even on a single curved line, due to differences in the remainder of their particle size distributions, they do establish a trend showing that the opacifying property diminishes as the percentage of +5 micron particles in the sample increases.

To justify the somewhat higher cost of fluid energy or jet milling, the resultant product should demonstrate improved opacifying properties as compared with the conventional vertical milled product, represented here by Sample B. Analysis of the data in Table II and of the points of FIG. 4 establishes that the fluid energy and jet milling operations should be so controlled to produce a product having no more than 12 percent of its particles larger than 5 microns, preferably no more than 5 percent, and most preferably no more than 2 percent. Also, at least 95 percent of the particles in the milled product should be smaller than 10 microns.

A comparison of samples E, F and D show the criticality of a limitation on the maximum amount of sub-micron particles present in the sample on the opacifying properties of the milled material. Samples E and F were produced by vibratory milling for 8 and 24 hours respectively and were found to contain significantly higher percentages of minus 0.3 micron particles than the fluid energy and jet milled samples. The particle size distribution of Sample D, for example, is bracketed by the particle size distributions of Samples E and F in the particle size above about 0.8 microns as shown by the corresponding curves in FIG. 2. Sample D, however, like the other jet and fluid energy milled samples, contains a significantly lower percentage of very small particles, e.g., minus 0.3 micron particles, than either of Samples E and F. Surprisingly, as a result of this difference, the opacifying properties of Sample D and the other jet and fluid energy milled samples meeting the 5 micron limitations mentioned above have significantly improved opacifying properties and light scattering coefficients as shown in Table II and as illustrated in FIG. 5.

Figure 5:
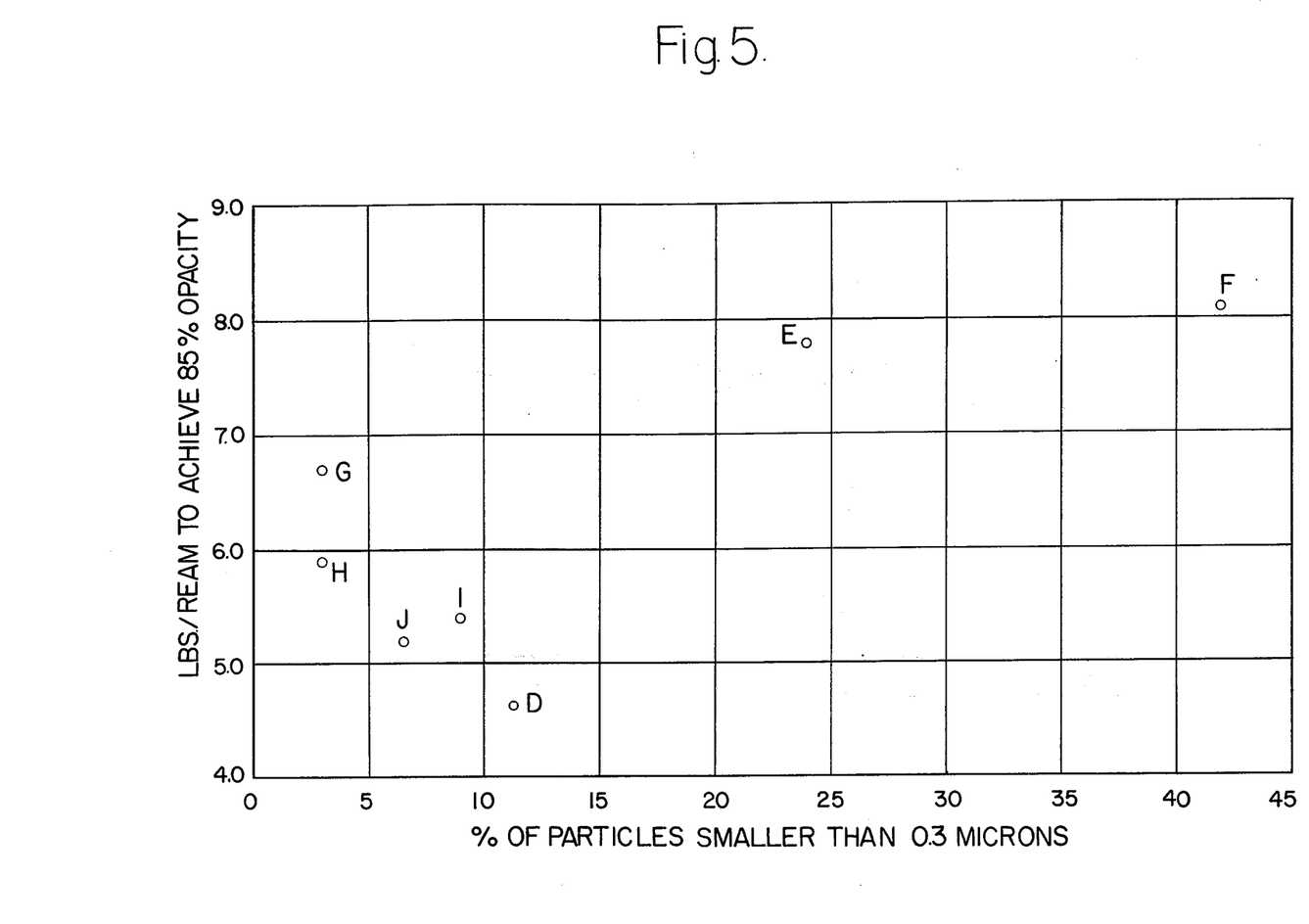
FIG. 5 is a graph in which the percentage of particles smaller than 0.3 microns in each jet or fluid energy milled talc sample having at least 95% of its particles smaller than 5 microns is plotted versus the opacifying property of the sample.

An analysis of the data in Table II and the points illustrated in FIG. 5 indicate that to justify the cost of jet or fluid energy milling the milled samples should contain no more than 15 percent minus 0.3 micron particles, preferably no more than 12 percent and most preferably about 5–12 percent.

To verify the laboratory hand sheet results set forth in Table II, a test was conducted in a full sized paper making process. This process normally utilized a conventional paper making batch containing about 4 percent of the vertical milled product of Sample B reported in Table II. In this test, all conditions were the same as used in normal production except the vertical milled product of Sample B was completely replaced with the same amount of a fluid energy milled product having a particle size distribution of 100% minus 10 microns, 99% minus 5 microns, 95% minus 4 microns, 74% minus 2 microns, 45% minus 1 micron, 35% minus 0.8 micron, 24% minus 0.6 micron, 10% minus 0.4 micron and 4% minus 0.3 micron. The properties of the paper made in this test are compared in Table III with the properties of normal production paper. In addition the use of the fluid energy milled talc material permitted the elimination of all of a minor percent of costly titania normally required in the conventional batch and periodic additions of titania conventionally made to the head box to maintain the desired opacity.

TABLE III

|  | Normal Production Paper | Test Paper |
| --- | --- | --- |
| Amount and Type of Talc Material Pigment Used | 4% vertical milled talc material containing about 30% tremolite | 4% fluid energy milled talc material containing about 30% tremolite |
| Brightness | 76.88 | 77.38 |
| Opacity (%) | 87.7 | 89.0 |
| Residual Ash of Ignited Paper | 13.12 | 13.90 |

These results confirm that the use of the milled talc material of the present invention results in greater opacity and as good or better brightness than the use of conventionally milled talc material. Accordingly, the lower conventional opacity could be achieved using significantly less of the milled talc material of the present invention than is presently required with the conventionally milled talc material.

The results from this production sized test also unexpectedly show that a greater percentage of the pigment of the present invention is retained in the paper as compared with the retention of the conventional roller or vertical milled material. Since the particles of the material of the present invention are generally smaller than those of the vertical milled talc material, it was expected that more of the particles of the finer product would pass through the fibrous mat of paper and be lost in the white water.

It is possible that the fine grinding of the talc particles present in the talc material increases the total organophilic surface area of the particles. Such particles would have a higher tendency to enter into a bonding bridging mechanism between organic particles and organic fibers present in the paper mat and therefore would be more likely to be held in the sheet by this physical attraction. If this theory is true, fluid energy or jet milled talc material should show a higher particle retention when used in a paper making process than vertical or roller milled talc material.

Although jet and fluid energy milling have been disclosed as preferred methods of obtaining the particle size distributions of the present invention, other techniques could be used. For example, it would be possible to remove a portion of the sub-micron particles from a conventionally milled sample that contained excessive sub-micron particles to achieve particle size distributions of the present invention. The particular apparatus and technique used to achieve the particle size distributions of the present invention are not critical to the desired result so long as the particles are the same or similar in size and shape as those described above as the present invention.

What we claimed is:

1. A milled talc material containing about 20 to about 35 percent tremolite and having a particle size distribution such that not more than 5% of the particles are larger than 10 microns, no more than 12% of the particles are larger than 5 microns and no more than 15 percent of the particles are smaller than 0.3 microns in equivalent spherical diameter.

2. A milled talc material according to claim 1 wherein no more than 5 percent of the particles are larger than 5 microns.

3. A milled talc material according to claim 1 wherein no more than 12 percent of the particles are smaller than 0.3 microns.

4. A milled talc material according to claim 2 wherein no more than 12% of the particles are smaller than 0.3 microns.

5. A milled talc material according to claim 4 wherein no more than 2 percent of the particles are larger than 5 microns.

6. A milled talc material according to claim 5 wherein about 5 to about 12 percent of the particles are smaller than 0.3 microns.

7. A milled talc material according to claim 6 wherein the tremolite content of the talc material is about 30 percent.

8. A milled talc material according to claim 4 wherein the tremolite content of the talc material is about 30 percent.

9. In a process of milling a talc material containing tremolite to obtain a finely divided pigment, the improvement comprising jet or fluid energy milling a talc material containing about 20 to about 35 percent tremolite and controlling the milling variables to produce a milled product having a particle size distribution such that no more than 5 percent of the particles are larger than 10 microns, no more than 12 percent of the particles are larger than 5 microns and no more than 15 percent of the particles are smaller than 0.3 microns in equivalent spherical diameter.

10. A method according to claim 9 wherein no more than 5 percent of the particles are larger than 5 microns.

11. A method according to claim 10 wherein no more than 12 percent of particles are smaller than 0.3 microns.

12. A method according to claim 11 wherein no more than 2 percent of the particles are larger than 5 microns.

13. A method according to claim 12 wherein about 5 to about 12 percent of the particles are smaller than 0.3 microns.

14. A method according to claim 13 wherein the tremolite content of the talc material is about 30%.

15. A method according to claim 11 wherein the tremolite content of the talc material is about 30%.

* * * * *